(12) United States Patent
Gao et al.

(10) Patent No.: US 10,856,069 B2
(45) Date of Patent: Dec. 1, 2020

(54) SEBUM RESISTANCE ENHANCEMENT FOR WEARABLE DEVICES

(71) Applicant: Bose Corporation, Framingham, MA (US)

(72) Inventors: Kai Gao, Marlborough, MA (US); Shawn Prevoir, Northborough, MA (US)

(73) Assignee: Bose Corporation, Framingham, MA (US)

( * ) Notice: Subject to any disclaimer, the term of this patent is extended or adjusted under 35 U.S.C. 154(b) by 147 days.

(21) Appl. No.: 16/206,559

(22) Filed: Nov. 30, 2018

(65) Prior Publication Data

US 2020/0177987 A1    Jun. 4, 2020

(51) Int. Cl.
*H04R 1/12* (2006.01)
*C08J 3/24* (2006.01)
*C08J 3/28* (2006.01)
*C08K 5/11* (2006.01)
*H04R 5/033* (2006.01)
*H04R 25/00* (2006.01)

(52) U.S. Cl.
CPC ............... *H04R 1/12* (2013.01); *C08J 3/245* (2013.01); *C08J 3/28* (2013.01); *C08K 5/11* (2013.01); *C08J 2300/26* (2013.01); *C08J 2309/06* (2013.01); *H04R 5/033* (2013.01); *H04R 25/654* (2013.01); *H04R 2225/77* (2013.01)

(58) Field of Classification Search
CPC ..... C08J 3/245; C08J 3/28; C08J 7/123; C08J 7/18; C08J 2300/26; C08J 2353/02; C08J 2365/00; C08J 2345/00; H04R 1/12; H04R 5/033; H04R 25/654; H04R 2225/77; H04R 1/1016; H04R 25/652; H04R 1/10
See application file for complete search history.

(56) References Cited

U.S. PATENT DOCUMENTS

| 3,791,913 | A | | 2/1974 | Ver Skate et al. |
|---|---|---|---|---|
| 4,981,912 | A | * | 1/1991 | Kurihara ................. C08J 3/245 525/326.3 |
| 2006/0083710 | A1 | | 4/2006 | Joerger et al. |
| 2009/0305381 | A1 | | 12/2009 | Bilek et al. |
| 2010/0211024 | A1 | | 8/2010 | Zamore |
| 2016/0264687 | A1 | | 9/2016 | Tran |
| 2018/0160216 | A1 | | 6/2018 | Dominijanni et al. |
| 2019/0284358 | A1 | | 9/2019 | Prevoir et al. |

OTHER PUBLICATIONS

Majumder, Wear, 221 (1998) p. 15-23 (Year: 1998).*
Pending unpublished U.S. Appl. No. 15/921,355, filed Mar. 14, 2018, Shawn Prevoir et al.

(Continued)

*Primary Examiner* — Robert C Boyle
(74) *Attorney, Agent, or Firm* — Bond, Schoeneck & King, PLLC (57) ABSTRACT

A method of treating a wearable device to resist sebum, the method including providing a body having an elastic material having a polymeric backbone where a portion of the polymeric backbone is unsaturated and the body has an outer surface. The method further includes forming a crosslinked matrix within an outer layer of the body surrounding an inner layer of the body such that the outer layer has less affinity to sebum than the inner layer of the body.

10 Claims, 7 Drawing Sheets

(56) References Cited

OTHER PUBLICATIONS

Shen Jian et al: "Fabrication and characterization of elastomeric semiconductive thiophene polymers by perozide crosslinking", Polymer Journal, Society of Polymer Science, Tokyo, JP, vol. 51, No. 2, Oct. 17, 2018 (Oct. 17, 2018), pp. 257-263, XP036675862, ISSN: 0032-3896, DOI: 10.1038/S41428-018-0137-4.
International Search Report and the Written Opinion of the International Searching Authority, International Application No. PCT/US2019/063368, pp. 1-15, dated Mar. 3, 2020.

* cited by examiner

SEBUM RESISTANCE ENHANCEMENT FOR WEARABLE DEVICES

BACKGROUND

This disclosure relates to treatments for wearable devices for improved sebum resistance.

SUMMARY

All examples and features mentioned below can be combined in any technically possible way.

In one aspect, treating a wearable device to resist sebum includes providing a body made of an elastic material having a polymeric backbone. A portion of the polymeric backbone is unsaturated and the body has an outer surface. Treating the wearable device also includes forming a crosslinked matrix within an outer layer of the body surrounding an inner layer of the body such that the outer layer has less affinity to sebum than the inner layer of the body.

Implementations may include one or more of the following. The elastic material may be a thermoplastic elastomer or a thermoset rubber. The elastic material may also include a crosslinking-promoting additive.

The outer layer may have a first storage modulus and the inner layer may have a second storage modulus, and the first storage modulus can be larger than the second storage modulus.

The outer layer may have a first crosslinking density and the inner layer may have a second crosslinking density, and the first crosslinking density can be larger than the second crosslinking density.

The crosslinked matrix can be generated uniformly throughout the outer layer of the body. The crosslinked matrix can be generated on at least one selected portion within the outer layer of the body such that the at least one selected portion has less affinity to sebum than at least another portion of the outer layer of the body.

The crosslinked matrix can be created by E-beam processing or photoinitation.

In another aspect, a wearable device includes a body made of an elastic material having a polymeric backbone. A portion of the polymeric backbone is unsaturated and the body has an outer surface. The wearable device also includes a crosslinked matrix formed between long chain molecules of the elastic material within an outer layer of the body surrounding an inner layer of the body such that the outer layer has less affinity to sebum than the inner layer of the body.

Implementations may include one or more of the following. The elastic material may be a thermoplastic elastomer or a thermoset rubber. The elastic material may also include a crosslinking-promoting additive.

The outer layer may have a first storage modulus and the inner layer may have a second storage modulus, and the first storage modulus can be larger than the second storage modulus.

The outer layer may have a first crosslinking density and the inner layer may have a second crosslinking density, and the first crosslinking density can be larger than the second crosslinking density.

The crosslinked matrix can be generated uniformly throughout the outer layer of the body. The crosslinked matrix can be generated on at least one selected portion within the outer layer of the body such that the at least one selected portion has less affinity to sebum than at least another portion of the outer layer of the body.

The crosslinked matrix can be created by E-beam processing or photoinitiation.

Other features and advantages will be apparent from the description and the claims.

DETAILED DESCRIPTION

Wearable devices commonly employ soft materials (e.g., rubber). However, such soft materials tend to have an affinity to sebum, which leads to dimensional changes or complete dissolution and even safety concerns such as bare wire exposure. Surface treatments of wearable materials, chiefly thermoset rubbers, can be effective to achieve improved resistance to sebum. Thermoplastic elastomers (TPEs), due to the lack of chemical crosslinking, are vulnerable to sebum attack, which limits the wide deployment of TPEs for wearable applications.

This disclosure is based, at least in part, on the realization that sebum is harmful to soft materials and that treating the surfaces of these materials can provide improved sebum resistance. Sebum is a waxy or oily substance that is excreted from sebaceous glands on the body. Chemically, sebum includes a mixture of long aliphatic chains with a polar protic end. Natural and synthetic rubbers with high molecular weight between crosslinking or without crosslinking, i.e., plastics, non-vulcanized rubbers, TPEs, etc., can have an affinity to sebum and easily swell and/or completely dissolve in sebum. Uniformly increasing crosslinking through polymeric materials requires longer in-mold time and extra post-cure steps which add additional cost, and significantly alters the mechanical properties of the material, which may not be advantageous for wearable products.

The present disclosure describes various embodiments of treatments for improved sebum resistance for wearable devices. More generally, applicant has recognized and appreciated that polymeric materials can be treated to provide enhanced sebum resistance, for example, by selectively adding chemical crosslinking to the outer layer of the polymeric material during post treatment steps. The crosslinking changes thermoplastic elastomers into a thermoset material that can swell upon exposure to sebum but only to a limited extent. In embodiments, at least a part of an outer portion of a body made of an elastic polymeric material can be treated with electron beam (E-beam) processing to produce a protective shell against sebum and has minimal impact to the bulk properties of the material. Moreover, this protective shell is chemically bonded to the rest of the polymer matrix, which offers robustness against abrasion, cracking pinhole and delamination, a typical challenge for all add-on top coats such as parylene, solvent-based hydrogenated nitrile butadiene rubber (HNBR) (Lord HPC-5B coating), fluoroelastomer (FKM) coatings, etc.

The embodiments and implementations disclosed or otherwise envisioned herein can be utilized with any suitable wearable device made of an elastic material, such as rubber, that has already been cured and/or shaped. Examples of suitable wearable devices include Bose QuietControl® headphones (manufactured by Bose Corporation of Framingham, Mass.), noise-blocking earplugs, and hearing aids. However, the disclosure is not limited to these devices, and thus the disclosure and embodiments disclosed herein can encompass any wearable device.

Figure 1:
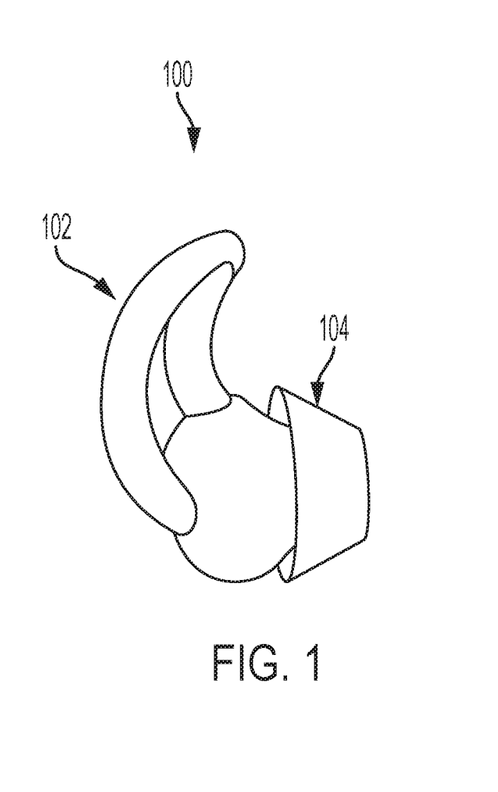
FIG. 1 is an example wearable device.

Referring to FIG. 1, an example wearable device 100, e.g., a Bose StayHear®+ tip (manufactured by Bose Corporation of Framingham, Mass.) is shown. The wearable device 100 in FIG. 1, including a tip base 102 and a tip wing 104, is commonly made of rubber. Depending on the nature of the rubber used, the tip may exhibit an affinity to sebum. As a result, wearable device 100 may exhibit a decrease in mechanical strength after prolonged exposure to sebum. In addition, due to the high tackiness of rubber, the wearable device 100 may attract dirt, which can compromise its acoustic seal and damage tissues of the wearer. Although wearable device 100 can be made of any suitable soft material, materials suitable for the chemical crosslinking described herein include any polymeric material containing some amount of unsaturation in the matrix, for example, styrene-butadiene block polymers (SB, SBS) and styrenic-based thermoplastic elastomers (TPE). The "unsaturation" refers to the presence of at least one carbon-carbon double bond or carbon-carbon triple bond in the matrix. The unsaturation may be present as a consequence of the material's formation, or the unsaturation may be introduced by any suitable process. Another example suitable material is compounded polynorbornene (Norsorex® material available from D-NOV GmbH of Vienna, Austria, product number M040822-15).

Figure 2:
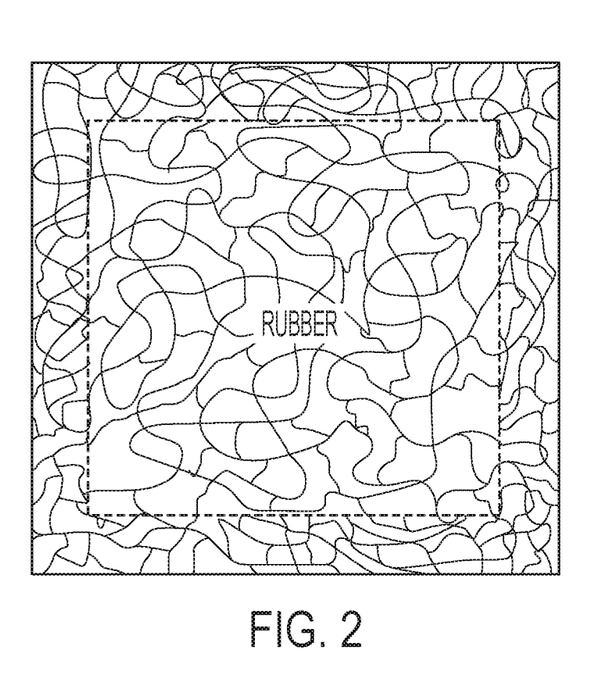
FIG. 2 is a schematic representation of an example thermoplastic elastomer having an outer layer with added chemical crosslinking surrounding an inner layer.

The methods described herein focus on adding chemical crosslinking on the outer layer of the material so that bulk properties are not impacted. As shown in FIG. 2, in embodiments an outer layer of a body made of an elastic polymeric material can be treated with electron-beam (E-beam) processing to produce a protective outer layer with minimal impact to the bulk properties of the material. In embodiments, selected portions of the outer layer can be treated with E-beam processing. The E-beam processing can be achieved with any suitable electron gun having a cathode, grid, and anode to generate and accelerate a primary electron beam. A magnetic optical system controls how the electron beam contacts the wearable device. In examples, E-beam processing is achieved by a high power accelerator available at E-BEAM Services, Inc. having locations in Lebanon, Ohio, Cranbury, N.J., and Lafayette, Ind.

Crosslinking change in treated wearable devices can be analyzed using a toluene uptake test. The toluene uptake test is performed by measuring the initial weight of a material before being immersed in toluene for 24 hours ($W_i$) and measuring the final weight of the material after being immersed in toluene for 24 hours ($W_f$). The percentage of uptake is calculated as follows $(W_f-W_i)/W_i \times 100$.

Figure 3:
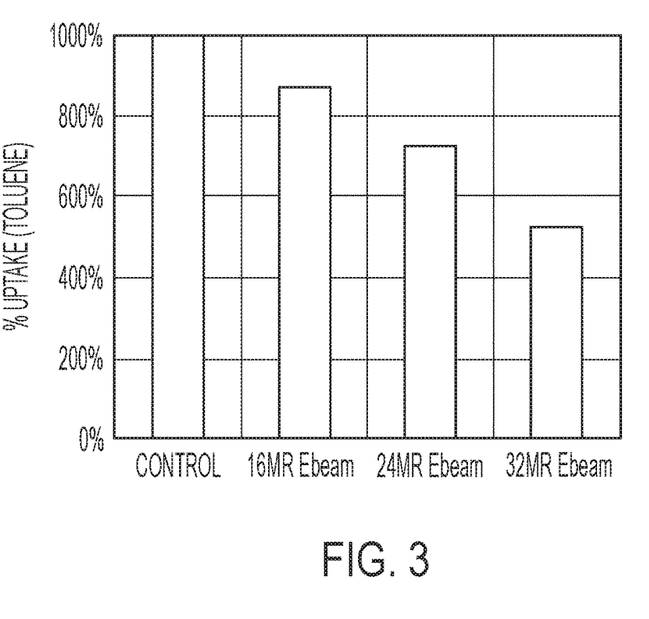
FIG. 3 shows a graph illustrating toluene uptake versus E-beam dosage in an example styrene-butadiene block polymer.
Figure 4:
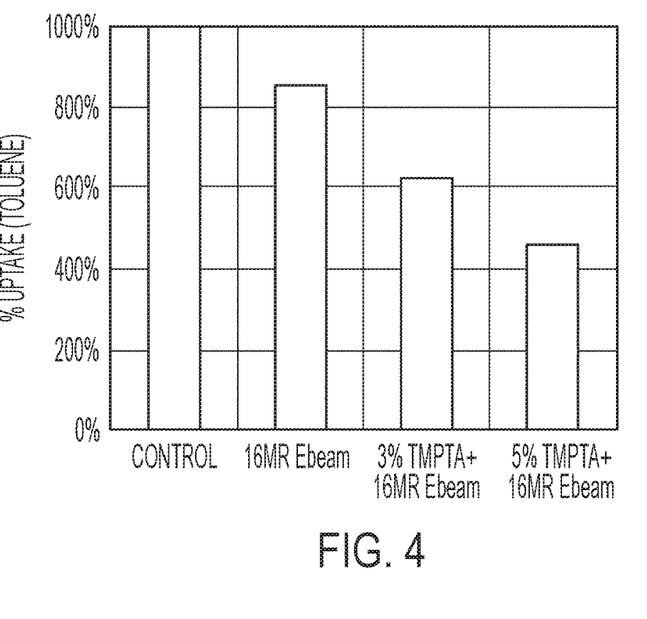
FIG. 4 shows a graph illustrating toluene uptake versus 16MR with changing crosslinking additive Trimethylolpropane Triacrylate (TMPTA) in an example styrene-butadiene block polymer.

For example, neat styrene-butadiene block polymers (SB, SBS) dissolve in toluene. In other words, neat SBS swells infinitely in toluene. SBS is a common block polymer used for TPE compounding. Thus, SBS that is characterized by enhanced sebum resistance will also provide enhanced sebum resistance for a TPE when used in TPE compounding. As the dosage of E-beam processing increases for SBS, the amount of chemical crosslinking increases and toluene uptake decreases. As shown in FIGS. 3 and 4, as the E-beam dosage increases along the abscissas, the toluene uptake decreases due to the increasing crosslinking density in the material.

The two left-most columns in FIG. 3 are substantially identical to the two left-most columns in FIG. 4 since they represent SBS without and with post treatment, respectively. The left-most columns in FIGS. 3 and 4 represent neat SBS without any post treatment. Accordingly, the left-most columns show the highest amount of toluene uptake. In comparison, the second left-most columns in FIGS. 3 and 4 show reduced toluene uptake since they represent SBS with ionizing post treatment (e.g., E-beam processing).

The third left-most column in FIG. 3 shows a further reduction in toluene uptake due to an increased E-beam dosage (24MR vs. 16MR). The reduction in toluene uptake indicates a further increase in chemical crosslinking caused by the increase in E-beam dosage. In FIG. 4, the third left-most column shows an even further reduction in toluene uptake since the SBS includes an additive that promotes chemical crosslinking (e.g., 3% trimethylolpropane triacrylate (TMPTA) or any suitable alternative). TMPTA carries additional unsaturation to promote the chemical crosslinking. Thus, embodiments including one or more additives (e.g., the 3% TMPTA) can provide more of an impact than merely increasing E-beam dosage.

The right-most columns in FIGS. 3 and 4 show that further increasing E-beam dosage and increasing the amount of TMPTA further increase the chemical crosslinking to reduce toluene uptake. The right-most column in FIG. 4 shows a more pronounced effect than the effect visible in the right-most column in FIG. 3, which indicates that increasing the amount of TMPTA to 5% can have a greater effect than merely increasing the E-beam dosage.

Adding chemical crosslinking using the methods described herein, significant improvements in sebum resistance are observed. For example, virgin SBS dissolves in 3 hours when fully immersed in synthetic sebum at 85 degrees Celsius. In contrast, an E-beam-treated SBS sample is still intact after 7 days when fully immersed in sebum at 85 degrees Celsius and then cooled to room temperature. In embodiments, in order to achieve these results (e.g., at least 7 days before failure in sebum) the E-beam dosage is 32MR. In embodiments where the E-beam dosage is 16MR, the E-beam-treated SBS sample is intact after 2 days. In embodiments where the E-beam dosage is 24MR, the E-beam-treated SBS sample is intact after 5 days. Thus, E-beam dosages 16MR, 24MR, and 32MR all show enhanced sebum resistance.

Figure 5:
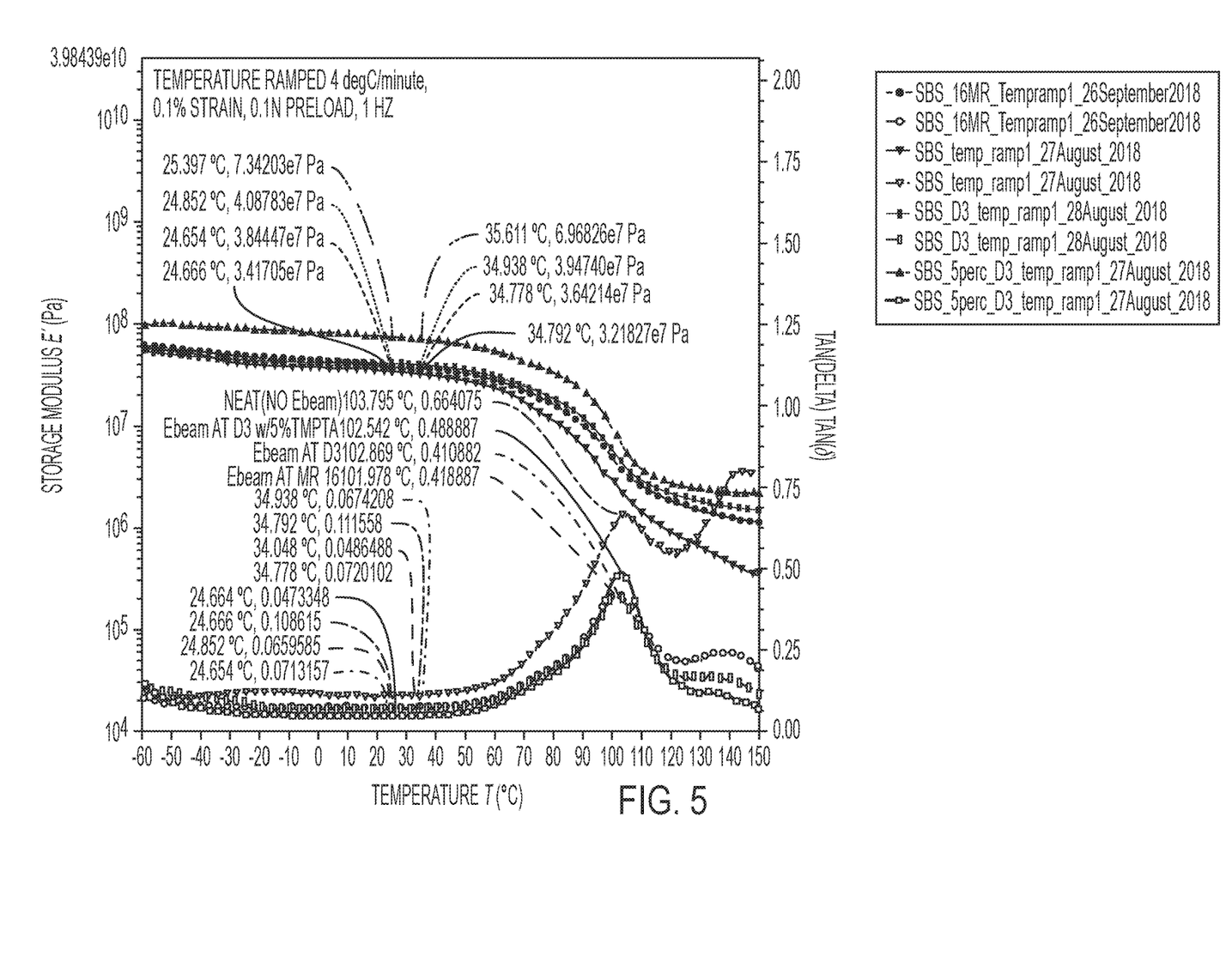
FIG. 5 shows a dynamic mechanical analysis (DMA) graph of an example styrene-butadiene block polymer.

The alteration of mechanical properties due to E-beam post treatment can also be evaluated using dynamic mechanical analysis (DMA). FIG. 5 shows a DMA graph of an example SBS. For example, the storage modulus of neat SBS at approximately 35 degrees Celsius (roughly skin temperature) is around 32.2 Mpa. When the SBS is treated with E-beam processing using a dose of 16MR, the modulus of the E-beam-treated SBS at approximately 35 degrees Celsius increases approximately 13% to 36.4 Mpa. When the SBS is treated with E-beam processing using a dose of 32MR, the modulus of the E-beam-treated SBS at approximately 35 degrees Celsius increases further to 39.5 Mpa. The modulus of the SBS when treated with E-beam processing using a dose of 32MR and 5% TMPTA increases further to 69.7 Mpa. Thus, E-beam treatment alone produces a small percentage change of modulus which indicates the E-beam-treated SBS has minimal change in modulus compared to untreated SBS. In addition, E-beam treatment and one or more crosslinking-promoting additives can produce a small percentage change of modulus. The increase in change of modulus directly relates to the extent of crosslinking. Thus, the greater the storage modulus, the greater the extent of crosslinking due to the E-beam processing and/or crosslinking-promoting additives.

Figure 6:
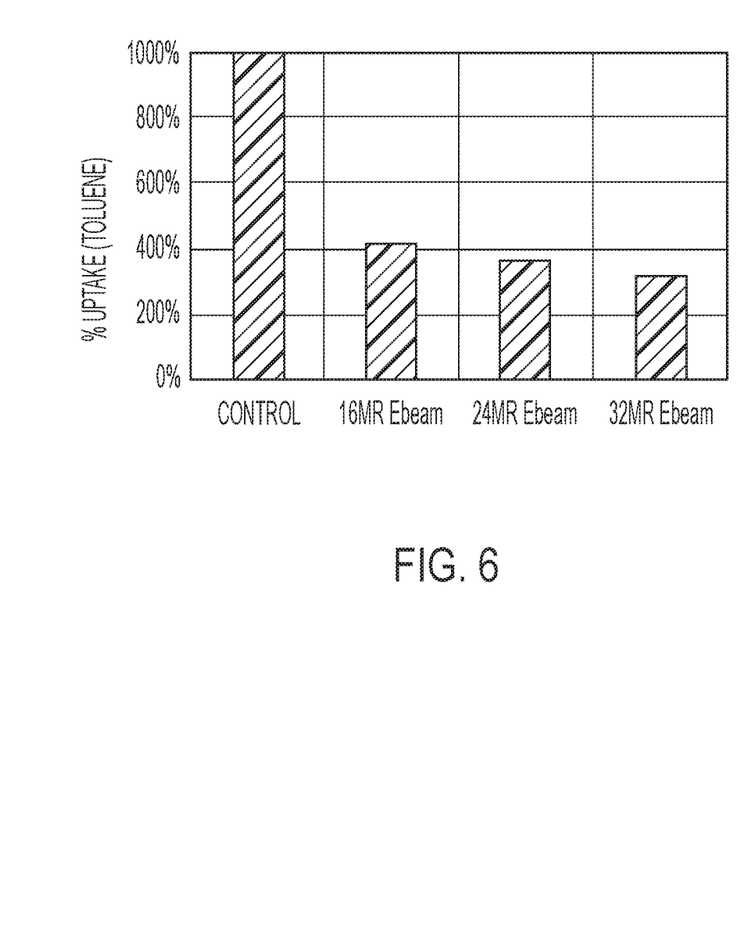
FIG. 6 shows a graph illustrating toluene uptake versus E-beam dosage in an example styrenic-based thermoplastic elastomer.
Figure 7:
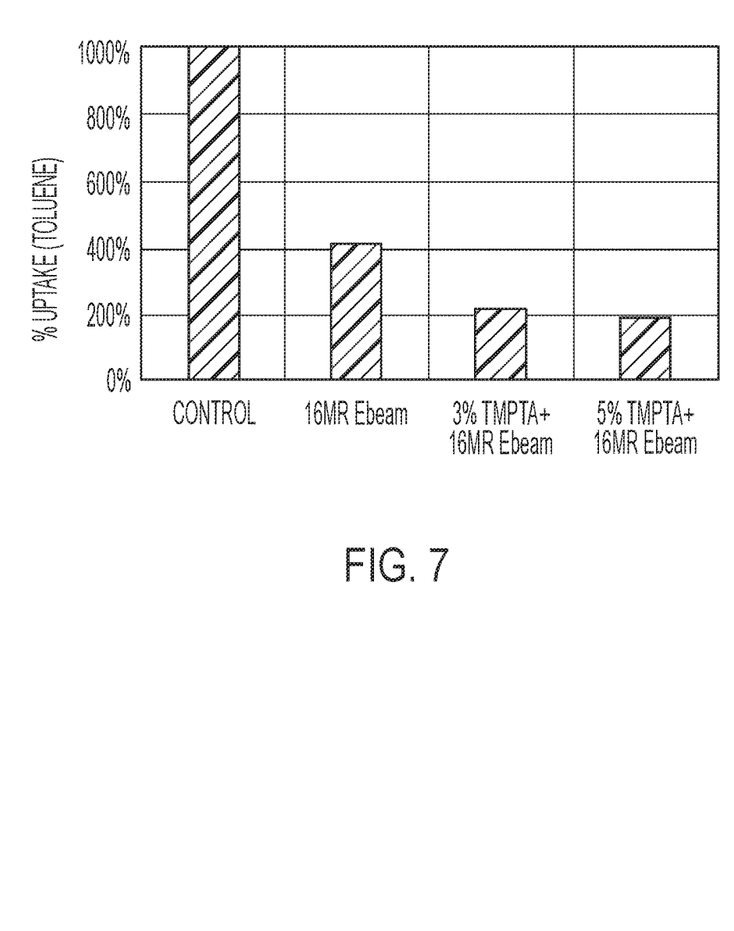
FIG. 7 shows a graph illustrating toluene uptake versus 16MR with changing crosslinking additive Trimethylolpropane Triacrylate (TMPTA) in an example styrenic-based thermoplastic elastomer.

Similarly, a styrenic-based thermoplastic elastomer (TPE) available from PolyOne of Avon Lake, Ohio, product number 481-047A9 ("A9") shows drastic improvements in sebum resistance with added chemical crosslinking using the methods described herein. Like SBS, A9 has some unsaturation, preferably at least 5% unsaturation, and dissolves in toluene when untreated. As the dosage of E-beam processing increases, the amount of chemical crosslinking increases and toluene uptake decreases. As shown in FIGS. 6 and 7, as the E-beam dosage increases along the abscissas, the crosslinking density in the material increases and toluene uptake decreases.

The two left-most columns in FIG. 6 are substantially identical to the left-most columns in FIG. 7 since they represent A9 without and with post treatment, respectively. The left-most columns in FIGS. 6 and 7 represent neat A9 without any post treatment. Accordingly, the left-most columns show the highest amount of toluene uptake. In comparison, the second left-most columns in FIGS. 6 and 7 show reduced toluene uptake since they represent A9 with ionizing post treatment (e.g., E-beam processing).

The third left-most column in FIG. 6 shows a further reduction in toluene uptake due to an increased E-beam dosage (24MR vs. 16MR). The reduction in toluene uptake indicates a further increase in chemical crosslinking caused by the increase in E-beam dosage. In FIG. 7, the third left-most column shows an even further reduction in toluene uptake since the A9 includes 3% TMPTA that promotes chemical crosslinking. Thus, embodiments including one or more crosslinking-promoting additives (e.g., the 3% TMPTA) can provide more of an impact than merely increasing E-beam dosage.

The right-most columns in FIGS. 6 and 7 show that further increasing E-beam dosage and increasing the amount of TMPTA further increase the chemical crosslinking to reduce toluene uptake. The right-most column in FIG. 7 shows a more pronounced effect than the effect visible in the right-most column in FIG. 6, which indicates that increasing the amount of TMPTA to 5% can have a greater effect than merely increasing the E-beam dosage.

By adding chemical crosslinking using the methods described herein, drastic improvements in sebum resistance can be observed. For example, virgin A9 dissolves in sebum after 2 days when fully immersed in sebum at 85 degrees Celsius. In contrast, an E-beam-treated A9 sample is still intact after 7 days when fully immersed in sebum at 85 degrees Celsius and then cooled to room temperature. In embodiments, in order to achieve these results (e.g., at least 7 days before failure in sebum) the E-beam dosage is 24MR or 32MR. In embodiments where the E-beam dosage is 16MR, the E-beam-treated A9 sample is intact for 5 days. Thus, E-beam dosages 16MR, 24MR, and 32MR all show enhanced sebum resistance.

Figure 8:
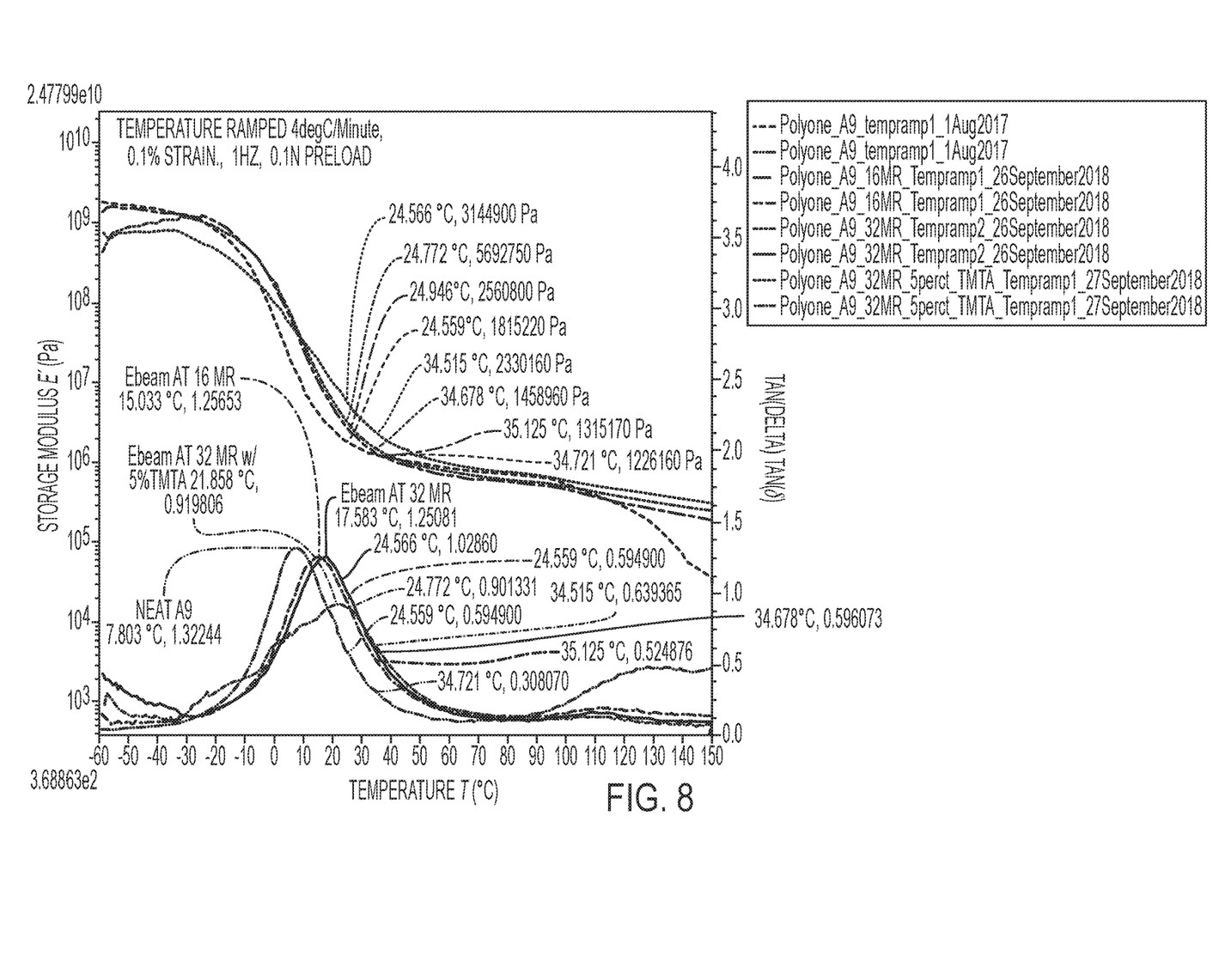
FIG. 8 shows a dynamic mechanical analysis (DMA) graph of an example styrenic-based thermoplastic elastomer.

The impact on mechanical properties due to E-beam post treatment can also be observed using DMA as discussed above. FIG. 8 is a DMA graph of A9. For example, the storage modulus of neat A9 at approximately 35 degrees Celsius (roughly skin temperature) is around 1.2 Mpa. When the A9 is treated with E-beam processing using a dose of 16MR, the modulus of the E-beam-treated A9 at approximately 35 degrees Celsius increases approximately 8.3% to 1.3 Mpa. When the A9 is treated with E-beam processing using a dose of 32MR, the modulus of the E-beam-treated A9 at approximately 35 degrees Celsius increases further to 1.4 Mpa. The modulus of the A9 when treated with E-beam processing using a dose of 32MR and 5% TMPTA increases further to 2.3 Mpa. Thus, E-beam treatment alone produces a small percentage change of modulus, which indicates the E-beam-treated A9 has minimal change in modulus compared to untreated A9. In addition, the combination of E-beam treatment and one or more crosslinking-promoting additives can produce a small percentage change of modulus. The increase in change of modulus directly relates to the extent of crosslinking. Thus, the greater the storage modulus, the greater the extent of crosslinking present due to the E-beam processing and/or additives.

Figure 9:
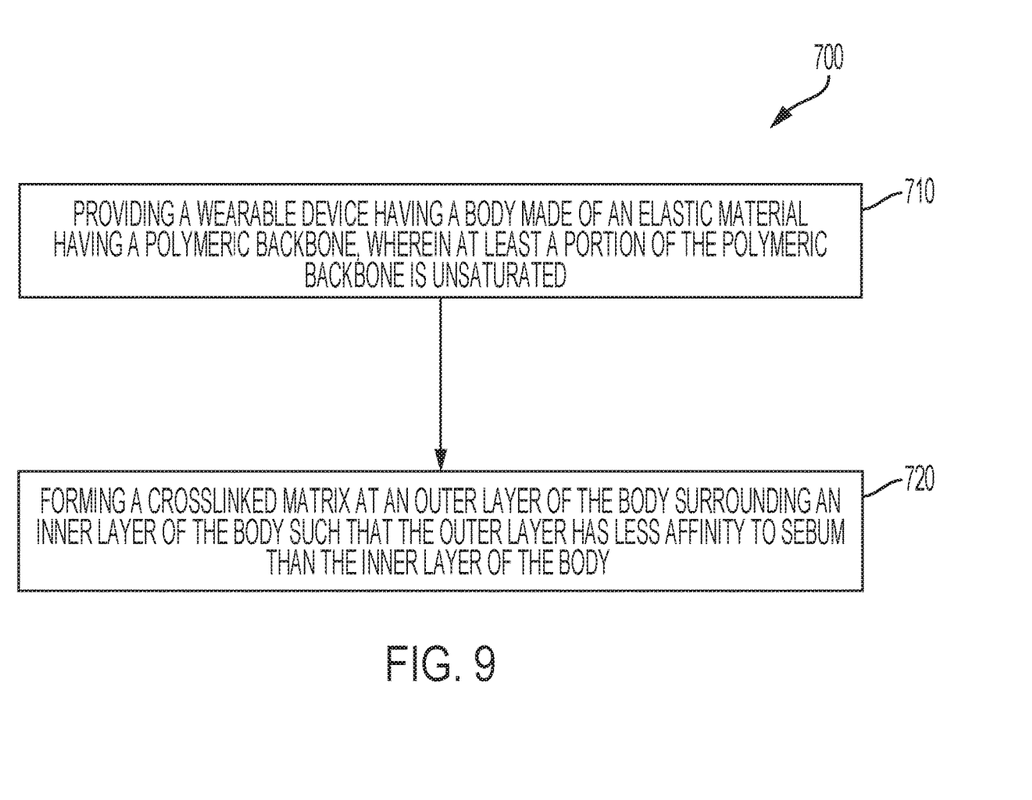
FIG. 9 is a flowchart of an example method of post treating a wearable device to provide enhanced sebum resistance.

FIG. 9 is a flowchart of an example method of treating a wearable device to provide enhanced sebum resistance. Post treating a wearable device is meant to occur after the processing steps in mold curing/crosslinking. Thus, after a wearable device is formed, it can be post treated according to the methods described herein.

At step 710, prior to treatment, a wearable device is provided, the wearable device having a body made of an elastic polymeric material, wherein a portion of the elastic polymeric backbone is unsaturated. The wearable device (e.g., wearable device 100) can be any device described or otherwise envisioned herein. For example, implementations of the body may include styrene-butadiene polymers, styrenic-based thermoplastic elastomers, vulcanized polynorbornene, or any suitable alternative. In example embodiments, the wearable device does not include crosslinking-promoting additives. In example embodiments, the wearable device can be pre-compounded with one or more additives, for example, trimethylolpropane triacrylate (TMPTA), a trifunctional monomer to promote crosslinking during E-beam post treatment. TMPTA is characterized by the following structure:

At step 720, at least one outer portion of the body is selectively crosslinked. In example embodiments, the outer portion of the wearable device is exposed to a beam of electrons that is accelerated to near light speed using any suitable accelerator. The accelerator includes a scan chamber such that as a beam of electrons passes through the scan chamber, the beam of electrons transitions into a curtain of electrons. When the curtain of electrons contacts the wearable device, the electrons trigger crosslinking reactions in polymer networks with or without additives. In other words, the accelerator provides a form of ionizing radiation which causes long chain molecules of the polymer to be ionized by the electrons. Then the ionized chains form connections to form a crosslinked matrix. The crosslinked material exhibits improved physical properties as compared with the uncrosslinked material (e.g., enhanced sebum resistance).

While the crosslinked matrix can be achieved using E-beam processing, it should be appreciated that the crosslinking described herein can be accomplished with any suitable radiation processing, including neutron scattering processing, or any other suitable alternative. Other embodiments can involve applying free radical generating photoinitiators through the bulk of the thermoplastic elastomer and applying light, such as UV radiation, to the surface to cause polymerization at the surface. Additionally or alternatively, any means of creating crosslinking on a rubber surface is contemplated.

The crosslinking described herein can also be attained by solution-based processes. For example, embodiments can involve applying peroxide to the surfaces of wearable devices and baking the peroxide on the surfaces to vulcanize the top layer. Such a process would involve spraying the devices with peroxide on a conveyor belt, heating the peroxide, and removing the devices from a conveyor belt.

The post treatments described herein preserve the benefits of using TPEs (low) and provide beneficial material properties at the outermost layer of a wearable device without interfering with the beneficial bulk properties of the wearable device (e.g., flexibility and softness). Advantageously, the treatments described herein are inexpensive and manufacturing friendly.

Other implementations are within the scope of the following claims and other claims to which the applicant may be entitled.

While several inventive examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive examples described herein. It is, therefore, to be understood that the foregoing examples are presented by way of example only and that, within the scope of the appended claims and equivalents thereto, inventive examples may be practiced otherwise than as specifically described and claimed. Inventive examples of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. A method of treating a wearable device to resist sebum, the method comprising:
    providing a body comprising an elastic material having a polymeric backbone, wherein a portion of the polymeric backbone is unsaturated, the body having an outer surface; and
    forming a crosslinked matrix within an outer layer of the body surrounding an inner layer of the body such that the outer layer has less affinity to sebum than the inner layer of the body and at least part of the outer layer is configured to provide an acoustic seal.

2. The method of claim 1, wherein the elastic material is a thermoplastic elastomer.

3. The method of claim 1, wherein the elastic material is a thermoset rubber.

4. The method of claim 1, wherein the elastic material includes one or more crosslinking-promoting additives.

5. The method of claim 1, wherein the outer layer has a first storage modulus and the inner layer has a second storage modulus, and the first storage modulus is larger than the second storage modulus.

6. The method of claim 1, wherein the outer layer has a first crosslinking density and the inner layer has a second crosslinking density, and the first crosslinking density is larger than the second crosslinking density.

7. The method of claim 1, wherein the crosslinked matrix is generated uniformly throughout the outer layer of the body.

8. The method of claim 1, wherein forming the crosslinked matrix comprises adding chemical crosslinking via E-beam processing.

9. The method of claim 1, wherein forming the crosslinked matrix comprises adding chemical crosslinking via photoinitiation.

10. A method of treating a wearable device to resist sebum, the method comprising:
    providing a body comprising an elastic material having a polymeric backbone, wherein a portion of the polymeric backbone is unsaturated, the body having an outer surface; and
    forming a crosslinked matrix within an outer layer of the body surrounding an inner layer of the body such that the outer layer has less affinity to sebum than the inner layer of the body;
    wherein the crosslinked matrix is generated on at least one selected portion within the outer layer of the body such that the at least one selected portion has less affinity to sebum than at least another portion of the outer layer of the body.

* * * * *